United States Patent [19]

Kritchman et al.

[11] Patent Number: 4,894,775
[45] Date of Patent: Jan. 16, 1990

[54] RECONSTRUCTION IN CT SCANNERS USING DIVERGENT BEAMS WITH FLATNESS CORRECTION FOR REORDERED DATA

[75] Inventors: Eliahu Kritchman, Tel Aviv; Jerome S. Arenson, Haifa, both of Israel

[73] Assignee: Elscint Ltd., Haifa, Israel

[21] Appl. No.: 215,762

[22] Filed: Jul. 6, 1988

[30] Foreign Application Priority Data

Jul. 17, 1987 [IL] Israel .................................. 83233

[51] Int. Cl.$^4$ ............................ G06F 15/42; A61B 6/03
[52] U.S. Cl. .................................................. 364/413.16
[58] Field of Search ............... 364/413.19, 413.16; 378/901

[56] References Cited

U.S. PATENT DOCUMENTS

| | | | |
|---|---|---|---|
| Re. 30,947 | 5/1982 | Boyd et al. | 364/413.16 |
| 4,075,492 | 2/1978 | Boyd et al. | 378/7 |
| 4,570,224 | 2/1986 | Shimoni et al. | 364/413.16 |
| 4,682,291 | 7/1987 | Reuveni | 354/413.18 |

*Primary Examiner*—Clark A. Jablon
*Attorney, Agent, or Firm*—Sandler & Greenblum

[57] ABSTRACT

Divergent X-ray beams of a computerized tomographic system are used for reconstruction with parallel reconstruction algorithms by determining "sets" of the divergent X-ray beams after passage through the patient at a number of angularly spaced positions within the angle subtended by the divergent beams. The determined sets are reordered, filtered and rebinned to obtain laterally spaced parallel filtered data that are backprojected to form the tomographic image. Corrections are made on the detected divergent beams to prevent "cupping" and to assure that the image has correct CT numbers.

28 Claims, 4 Drawing Sheets

RECONSTRUCTION IN CT SCANNERS USING DIVERGENT BEAMS WITH FLATNESS CORRECTION FOR REORDERED DATA

FIELD OF THE INVENTION

This invention relates to divergent beam radiation tomography and more particularly to methods for rearranging such divergent beams to facilitate their use in tomography.

BACKGROUND OF THE INVENTION

Computerized X-ray apparatus such as CT scanners use a plurality of processors to obtain desired tomographs. The scientists who design such equipment are continuously seeking ways and means for reducing the quantity of computations required to obtained the tomograph while striving to maintain high picture fidelity of good resolution with minimal artifacts. Such designers continuously compromise between complexity or quantity of computations required and the quality of the tomograph. Such compromises are found, for example, in U.S. Pat. Nos. Re 30,947, 4,075,492, and 4,570,224. The aforementioned patents are concerned with CT scanners that use divergent beams radiating from a source of X-rays. Using divergent beams instead of parallel beams inherently requires many more computations to reconstruct an image. Rather than proceeding with the significantly greater number of computations required with divergent beams, the above patents offer the compromise solution of "re-ordering" the divergent rays (or fan beams) to parallel rays or views.

However, the spacing between samples obtained by the re-ordering process is laterally unequal. The unequal spacing results in artifacts (diminution of picture quality). The prior art approaches to reconstruction techniques when the X-ray sources provided divergent beams have traditionally followed three techniques, which are:

1. Using special divergent beam backprojecting or reconstruction algorithms based on the divergent beam geometry scanners;

2. Reordering the raw data into parallel beam shadowgraph data with non-equal spacing then rebinning the non-equal spacing into parallel equal space shadowgraph data and then applying preprocessing filtering and backprojecting algorithms based on the parallel beam, equal space scanner geometry; and 3. Reordering the raw data into two separate sets, the first set is rebinned to enable pre-processing based on parallel beam equal spaced scanner geometry followed by modified filtering and backprojecting. The rebinned, re-ordered first set is operated on during the rebinning, etc. to assume a spacing which counteracts the unequal spacing of the re-ordered raw data of the second set. The recombined sets thus provides high quality images with reduced computational steps.

There are explicit drawbacks inherent in each of the above implementations. They are increased mechanical complexity, increased computation time, or spatial resolution that is reduced to below that theoretically possible; and increased image artifacts as a result of the approximations in the algorithms.

The use of the mathematically correct algorithms of the first technique for pre-processing filtering and backprojecting based on the divergent beam geometry of the scanners would result in images which have no reduction from the theoretically possible spatial resolution, and have a minimum of artifacts. However, the first technique is mathematically complex and requires a relatively large amount of computation time.

The second technique, that is the rebinning by interpolation to convert the unequal lateral spacing to the equal lateral spacing converts the fan beam geometry to parallel beam geometry. The conversion reduces the number of computations in the reconstruction algorithm. However, the rebinning process introduces a smoothing effect and significantly reduces the system's spatial resolution.

The third technique is the most efficient from the computation time aspect. However, the geometric approximations may introduce image artifacts as well as reduce spatial resolution.

Accordingly, there exists a problem for which a complete solution still has escaped the experts and proven elusive. That is, the need for a method and system for reconstructing images using parallel reconstruction algorithms when the data is obtained from CT scanners using divergent beam geometry.

According to the present invention the sought after solution is to provide a method for detecting, modifying, and rearranging divergent beam derived data to obtain tomographic images with maximum spatial resolution and minimum artifacts in a relatively short time, that is, by reducing computation quantities and/or time to a minimum.

In accordance with a preferred broad aspect of the present invention, a method of detecting, modifying and rearranging divergent beam derived data to obtain tomographic images having maximum spatial resolution and minimum artifacts using a reduced number of computations is provided, said method comprises the steps of:

directing divergent beams of penetrating radiation through a body being examined from source means on one side of said body to detector means on the other side of said body, angularly displacing the divergent beams and detectors relative to the body, detecting radiation that is passed through the body at a number of angularly spaced positions within the angle subtended by the divergent beams, determining sets of detected radiation data representative of the plurality of angularly and laterally spaced shadowgrams indicative of the transmission of radiation through the body, reordering said data that correspond to determined sets of detected radiation data into data corresponding to parallel projections, the spacing between projections being laterally unequal, filtering the reordered data, rebinning the reordered, filtered data to obtain equal laterally spaced parallel filtered data, and backprojecting said equal laterally spaced parallel filtered data to form tomographic images.

A feature of the invention provides for rebinning at a density that is greater than half the Nyquist criterion.

A related feature of the invention provides for rebinning at density equal to the Nyquist criterion.

Yet another feature of the invention provides for making corrections on pre-processed data to prevent cupping and dishing artifacts.

Another feature of the invention provides for making a correction to assure that the tomographic image has the correct CT numbers. This last correction uses a rating function which is related to the geometry of the particular tomographic equipment used in obtaining the image. This feature provides for obtaining the correction factor to be used in assuring the correct CT number of the output data by determining a relationship between the integrals of a view data using fan beam correction and using true rebinning.

BRIEF DESCRIPTION OF THE DRAWINGS

The above named and other objects and features of the present invention will be better understood when considered in the light of the following description of a broad aspect of the invention made in conjunction with the accompanying drawings, wherein.

GENERAL DESCRIPTION

Figure 1:
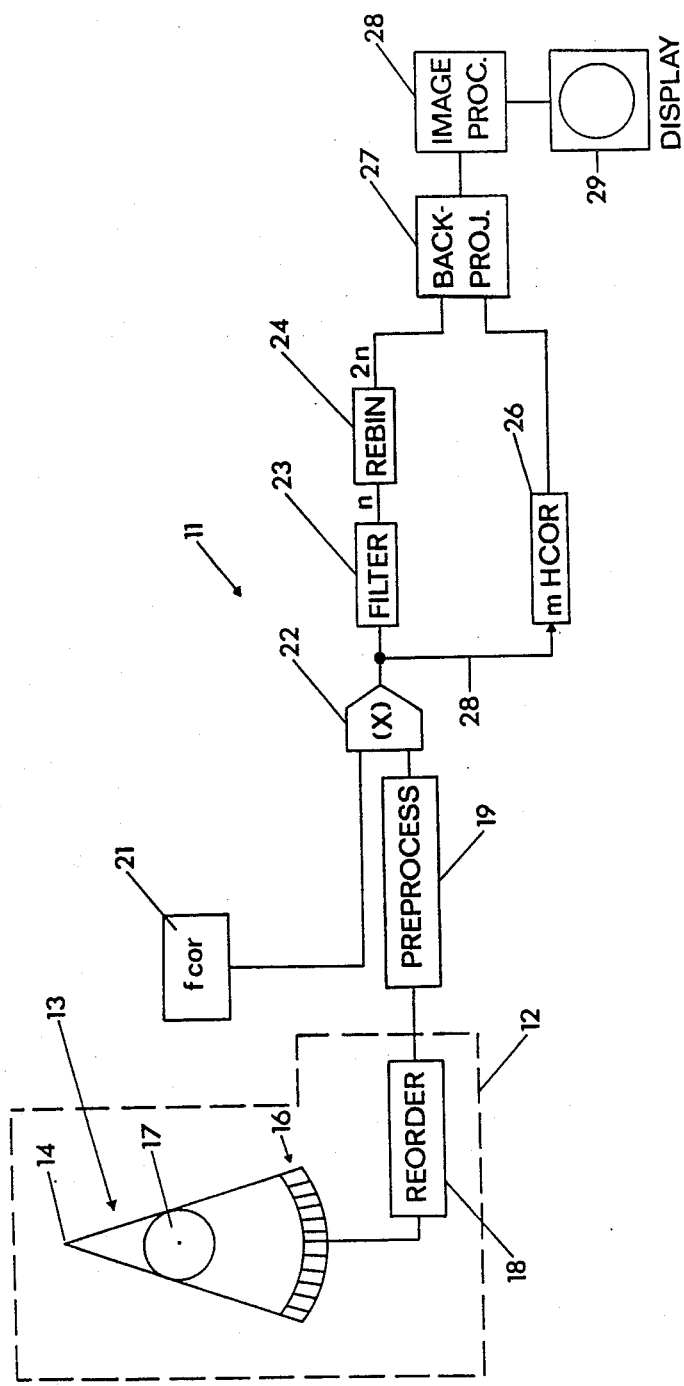
FIG. 1 is a block diagram of the inventive system.

FIG. 1 is a block diagram showing the inventive system. In FIG. 1, 11 represents the entire system which includes a data acquisition portion 12. The data acquisition portion includes a gantry 13 having an X-ray source 14 and a group of detectors 16. The gantry rotates at angular distances about the patient indicated at 17. The detectors 16 provide signal values that are responsive to the density of the parts of the body through which X-rays have passed. In accordance with normal CT procedures many views are taken to enable assembling a tomographic display.

The fan beam source 14 provides fan beams of X-rays and consequently fan beam data as distinguished from parallel beam data. The system computer, filter and backprojector operate on parallel beam data. Accordingly several steps are needed to convert the fan beam data to parallel beam data for backprojection.

First, the fan beam data is reordered in reorder unit 18. The output of the reorder unit 18 is non-equally spaced parallel shadowgram data. The non equally spaced parallel shadowgram data is preprocessed in the pre-process unit 19.

Means are provided for minimizing artifacts such as "cupping" or "dishing" artifacts. More particularly the preprocessed data from unit 19 is multiplied by a fan beam correction vector held in unit 21. The multiplication is accomplished in unit 22. The purpose of the F-cor correction is to "flatten" the data. The output of multiplication unit 22 is then filtered by filtering unit 23. Filtering unit 23 may be a normal parallel data filter. Subsequently, the filtered data is rebinned in rebin unit 24. The rebinning corrects for the unequal lateral spacing of the reordered fan beam data.

The rebinning operation is unique because it makes output data more dense than the input. For example if n data points are input to the rebin unit 24, 2n data points are output. This ensures no quantization errors in the rebinning process.

Furthermore, the rebinning is done after filtering in a preferred embodiment. The rebinning can be done at any stage after the reordering and in the prior art is done before filtering. However, by not rebinning until after the filtering, time efficiency is improved because the filtration time is proportional to the number of data points to be filtered.

Means are provided for assuring that the output has correct CT numbers. More particularly the rebinned data output is backprojected with a modified height correction. The modified height correction is obtained from mHcor unit 26. The unit 26 obtains its input from the output of multiplication unit 22 as indicated by line 28. The output of the mHcor unit 26 is sent to the backprojector 27 to be used when backprojecting the rebinned data to obtain the image. The output of backprojector 27 is sent to an image processor 28 and the output of the image processor is the image that is displayed on unit 29.

FIG. 1 indicates that in a preferred method of this invention, the following steps are accomplished:

The divergent fan beam data is reordered in reorder unit 18 so that unequal laterally spaced parallel projections are obtained. The reordered data is preprocessed in a preprocessing unit 19 that provides normalized unequal laterally spaced parallel logarithmic data.

The sample dependant fcor vector modifies the unequal laterally spaced preprocessed logarithmic data in a manner that corrects to assure the "flatness" of the filtered projections to minimize "dishing" and "cupping" artifacts. A theoretical cyclindrical phantom is used to obtain the Fcor values. The theoretical data of a cylindrical phantom being operated on by the Fcor process can pass through the equal laterally spaced parallel filter processor and result in a flat topped filter projection.

The output of the multiplier unit 22 is used among other things, for determining the modification values for height correction (CT Number) as accomplished by mHcor unit 26. The height correction modification is determined by effectively comparing the preprocessed logarithmic data of a reference view that has the unequal laterally spaced parallel samples to theoretical values of equal spacing for the same view. Note that the modification values are obtained using only one reference view.

The mHcor values are factors for correcting the CT values of the final display. These mHcor values are obtained as part of the fcor processing from multiplier unit 22. It may also be obtained directly from the preprocessed values of the preprocessor unit 19.

The corrected unequal laterally spaced preprocessed projections are then filtered. The filtering process prepares the views for back projection and limits the spatial frequency bandwidth of the data to improve the signal to noise ratio of the output image.

Rebinning is accomplished to correct the unequal spacing. The rebinning can be accomplished by interpolation alone or by providing a correcting spacing on a set of projections to cancel the unequal spacing originally obtained.

In accordance with a preferred embodiment of this invention, the rebinning is accomplished by linear interpolation of the filtered projections into a double density format.

The resulting double density equal laterally spaced filtered data is then backprojected in conjunction with the mHcor factor of the step previously obtained. The resulting image is then displayed.

The advantage of the method and system is then the arithmetic complexity is reduced while high spatial resolution is acheived with the minimal image artifacts. As a result the time required for processing the raw data into tomographic images is minimized while the theoretical spatial resolution of the acquired raw data is fully utilized and clearly observable in the final image.

Figure 2:
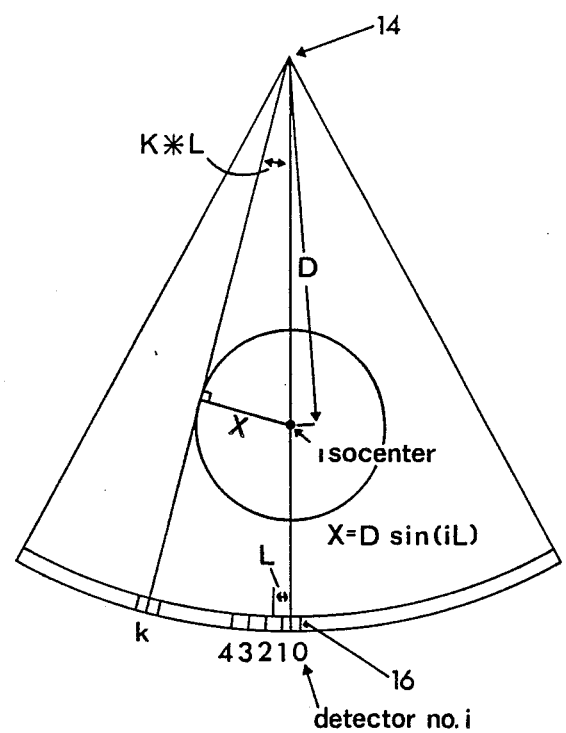
FIG. 2 is a line drawing showing geometrical relationships in the scanner of FIG. 1.

The invention of FIG. 1 is better explained using the geometric relationships of FIG. 2 which shows a portion of the CT gantry. Therein, a fan beam X-ray source 14 shown as displaced from the iso center by the radial distance D. The individual detector numbers are indicated by an i in the description that follows. Each detector is shown having a center to center angular spacing of L. Note that the radial distance from the machine isocenter of a fan beam ray falling on detector k is X(k) and:

$$X_f(k) = D \sin(kL) \tag{1.0}$$

If one uses a parallel beam geometry with equal laterally spaced sample. This distance becomes $$X_p(k) = D*k*L \tag{1.1}$$

The theory of the fcor correction may be outlined as follows. A cylindrical calibration phantom of radius b positioned at the machine isocenter becomes a perfect ellipse in the prep stage. The general expression for an ellipse is:

$$y = a[1 - (X^2/b^2)]^{\frac{1}{2}} \tag{1.2}$$

where
a = major axis, and
b = minor axis.
Specifically, expression (1.2) may be written as $$\text{prep}(i) = a(1 - [X^2(i)/b^2])^{\frac{1}{2}} \tag{1.3}$$

where
i = detector number,
a = height in prep units,
b = radius in millimeters of the cylindrical phantom, and
X(i) = radial distance from the machine isocenter of a ray falling on detector (i) in millimeters.
Some machine geometry constants are defined as:

D = source to isocenter axis distance (630 mm),
beta = detector-to-detector angle (9/110 degrees), and
L = detector-to-detector angle in radians
  = (beta × pi) / 180 radians;

then for equal laterally spaced beam geometry, using a phantom whose edge falls on detector k, we can define $$X_e(i) = D*i*L \tag{1.4}$$

and $$b_e = D*k*L \tag{1.5}$$

thus, the expression for the equal laterally spaced ellipse (1.3) becomes:

$$\text{prep}_e(i) = a[1 - (i/k)^2]^{\frac{1}{2}} \tag{1.6}$$

For a fan beam of nonequal laterally spaced geometry, in a similar fashion we defined:

$$X_n(i) = D* \sin(i*L) \tag{1.7}$$

$$b_n = D* \sin(k*L) \tag{1.8}$$

Then the expression for the nonequal spaced ellipse (1.3) becomes:

$$\text{prep}_n(i) = a(1 - [\sin(i*L)/\sin(k*L)]^2)^{\frac{1}{2}} \tag{1.9}$$

The fcor correction vector alters by a multiplicative factor the nonequal laterally spaced fan-beam prep to an equal laterally spaced parallel-beam prep, and thus the correction vector, which is detector dependant, is defined as $$fcor(i) = \left[ \frac{1 - (i/k)^2}{1 - [\sin(i*L)/\sin(k*L)]^2} \right]^{1/2} \tag{1.10}$$

The dependance on object size (k value) is insignificant and a "middle" value of k is used without noticeable artifacts appearing for different sized objects. Consequently only a single correction vector needs to stored which is applied to all scans.

The fcor flatness correction vector corrects for image flatness regardless of object size and material. It is based on a perfect cylinder centered in the scan circle. Flatness correction assures that there are no cupping or dishing artifacts generated and if there are they are corrected by the four factor.

Preprocessing at block 19 among other things takes the natural log of the reordered projections. The fcor correction is then made for removing cupping and dishing artifacts. The advantage of the fcor correction is that it does not degrade the spatial resolution, such as would result from linear interpolation rebinning and it eliminates most of the effects of nonequal spacing between samplings. It is simply a vector multiplication operation and therefore is inherently at least twice as fast as true interpolation.

The flatness correction factor modifies the preprocessed data to acheive image flatness. However, the preprocessed data is still not equivalent to that truly obtained with equal laterally spaced samples because of a shift in CT level as the object size changes. It has been noted that the larger the object the lower is the uncorrected CT value in the output image. To correct for CT level shift the mHcor is used. The mHcor value is object dependant. The modified height correction factor used is the integral of the view data interpolated in the standard fashion (that is, interpolated into equal spaced samplings) compared to the integral of the view after the fcor factor correction. The mHcor equals:

$$mHcor = \frac{\text{integral } fcor \text{ view}}{\text{integral interpolated view}} \tag{1.11}$$

The calculation at first appears unduly long, but it simplifies tremendously due to two features, which are:

(a) mHcor may be found on any single view and applied to the remaining views without recalculating the value; thus in a preferred method it is found on a single reference view of the preprocessed data corresponding to the 12 O'clock position in the scanner;

(b) the actual process of interpolation followed by integration is not required and instead the integral of the interpolated view can be determined by summing the appropriate weighted fcor view samples directly and producing an integral value as though the input view had truly been interpolated.

The determination of the integral weighting factor is accomplished by defining interpolation tables for nonequal spaced to equal spaced beam geometry corrections. The tables comprise two vectors which are:

(1) Vector Point (i) containing indices pointing to the detector unit to the left of the desired interpolation position; and (2) Vector Weight (i) which is the weighting factor for a linear interpolation calculation between the two neighboring input data points.

Since the nonequal laterally spaced beam data is sampled in positions defined as:

$$X_n(j) = D * \sin(J*L) \text{(mm)},$$

and whereas equal laterally spaced beam acquisition assumes the data is binned as:

$$X(i) = D*i*L \text{(mm)};$$

we can determine the left hand sample position to the desired interpolation point as Point (i)=j, where:

$$X_n(j) > X_e(i) <= X_n(j+1).$$

Then we can define an interpolation weighting factor as:

$$\begin{aligned}\text{Weight}(i) &= (X_e(i) - X_n(j))/(X_e(j-1) - X_e(j)) \\ &= (iL - \sin(jL))/((j-1)L - jL) = \sin(jL)/L - i\end{aligned}$$

To apply a true interpolation to the preprocessed data the two vectors may be used as follows: for sample i first the left hand sample index is determined as;

$$j = \text{point}(i), \text{ and}$$

then the interpolated value of the sample point is calculated according to the equation:

$$\text{prep}_e(i) = \text{prep}_n(j) + [\text{prep}_n(j-1) - \text{prep}_n(j)] * \text{Weight}(i)$$

where:
prep$_n$ = input nonequal laterally spaced beam data, and
prep$_e$ = interpolated equal laterally spaced beam data.

Note that in the case at hand the actual interpolation need not be performed and that the integral weighting vector is all that is needed. To determine the appropriate weighting vector (INTWT(i)) that can be applied directly on the nonequal spaced data in the integration process, one uses a simple loop as follows:

```
do i = 1, view_length j = Point (i)

INTWT(J) = 1 - Weight (i) + INTWT (j)

INTWT(j - 1) = Weight (i) + INTWT (j - 1)

end do.
```

The equivalent fully interpolated integral is then found using the fcor prep weighted by this precalculated vector. That is:

$$\text{integral interpolated view} = \Sigma \text{prep}_e(i) * fcor(i) * intwt(i)$$

and $$\text{integral } fcor \text{ view} = \Sigma \text{prep}_n(i) * fcor(i)$$

Consequently the height modification values (eq. 1.11) can be determined.

To correct for geometric distortions, introduced by the back projector, in a preferred embodiment a rebinning operation is used that interpolates into twice the sample points in each view. This assures that there is no reduction in spatial resolution and no generation of radial noise patterns or ring artifacts as a result of traditional interpolation rebinning.

Figure 3:
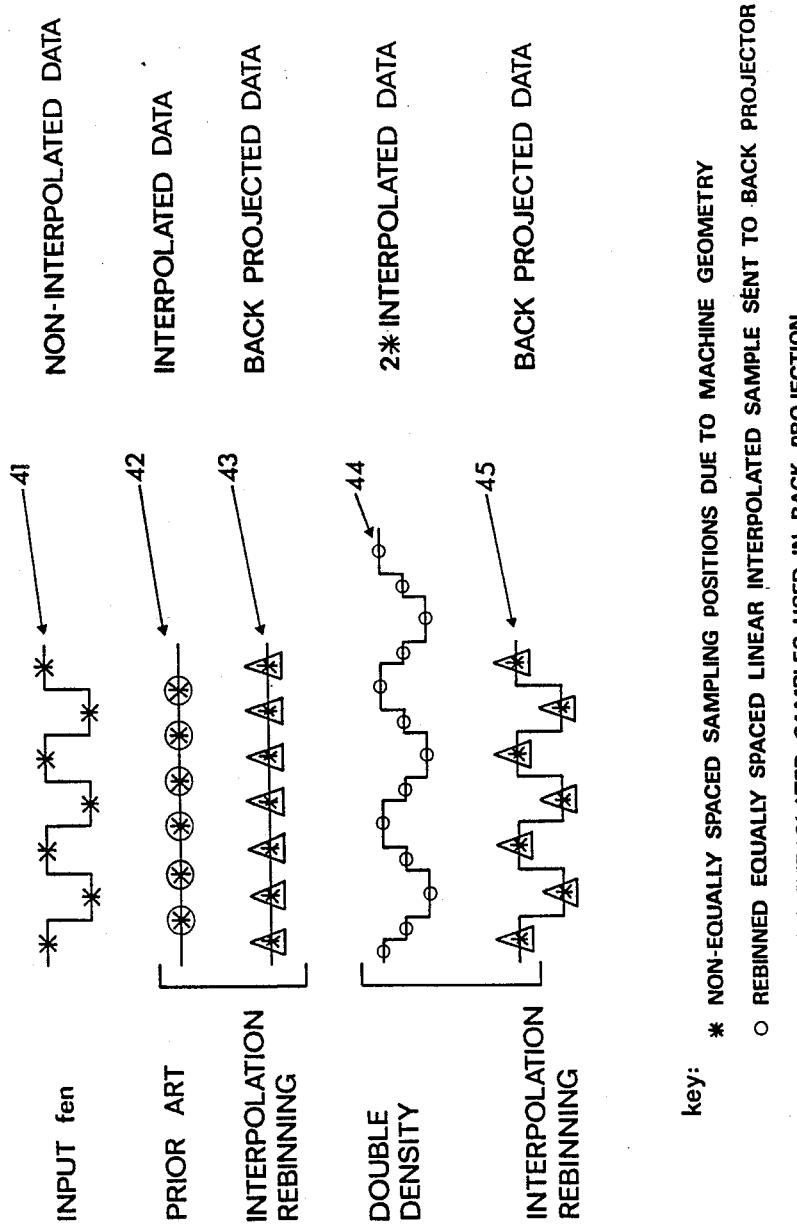
FIG. 3 is a graphical showing to aid in explaining the rebinning of a preferred embodiment.

FIG. 3 indicates in pictorial form the sampling and interpolation of data during the rebinning and back-projecting processes. In FIG. 3 the symbols *, and have the following meanings:

* normally spaced sampling positions as a result of machine geometry, rebinned equally spaced linear interpolated samples sent to the backprojector, and linear interpolated samples used in the backprojector.

According to FIG. 3 the nonequal spaced data is shown at 41. The rebinned interpolated data of prior art systems is shown at 42, the backprojected data of the prior art systems is shown at 43. The double density interpolated data is shown at 44 and the data of 44 back projected is shown at 45. It is evident from the figure that signal modulation in the back projected data 43 is reduced to zero with the prior art rebinning while the preferred method preserves the original modulation (45).

The improved performance of rebinning that interpolates into twice the sample points on each view can be explained as follows:

(a) interpolating into twice the samples does not degrade the MTF as a corollary of the Nyquist sampling theorem, and (b) since twice the data points are passed to the backprojector, the linear interpolation used for finding the correct value for backprojection at the desired angle is twice as precise.

Thus, this feature reduces the errors in back projection and enhances the high contrast resolution.

Figure 4:
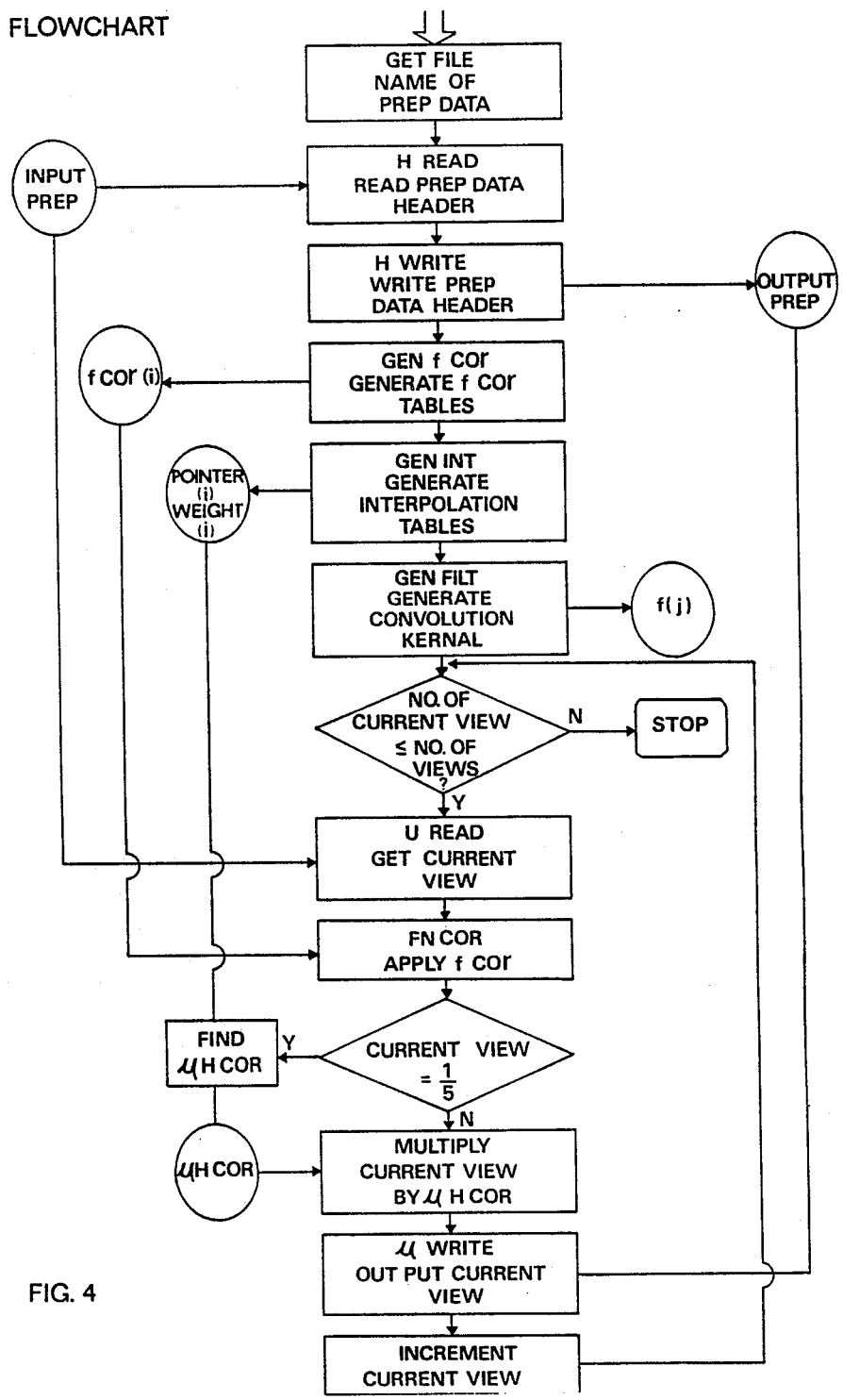
FIG. 4 is a flow chart helpful in describing the operation of the system of FIG. 1.

The flow diagram for the computer program for calculating and applying fcor and mHcor correction to nonequal laterally spaced preprocessed data and then filtering the data is shown in FIG. 4. The corrected data is then subjected to the double density interpolation rebinning and backprojection into the output image. The actual computer reconstruction programs in Fortran language are as follows:

```
+help  program jfhcor.for ver. 1.0 applies two corrections to prep or interpolated body-shifted
       data:

1. fan correction
                     Corrects for flatness of image. Perfectly matched
                     to circular objects centered at machine isocentre.
                     Any variation from these conditions degrade the
                     performance. The explanation of the algorithm
                     appears in subroutine genfcor.
              2. hcor correction
                     Corrects for ct level variations as object changes
                     in size. The algorithm is based on the assumption
                     that the prep/inter data is already corrected for
                     for flatness (ie. fcor applied). The integral of
                     this data (sumfc) is proportional to the ct value of
                     the image. To determine the correction factor, in
                     essence a true interpolation must be performed on
                     fan-beam acquired data and the integral found (sumint)
                     The correction factor, which can be either applied
                     to the prep data or to hcor on the system is
```

$$xhcor = 1 + (sumint - sumfc) / sumfc = \frac{sumint}{sumfc}$$

```
              In practice, the interpolation need not be done
              but rather the weighting values for the interpolation
              be used in calculating the sum of the prep data
              directly.

Further, if the prep data is already corrected for
              fan aquisition (ie fancor applied) these weighting
              factors can be removed from the weighting values
              for the interpolated summation, and the summation
              be done on fancor data. In this case the factor
              is calculated as
```

$$xhcor = 1 + (sumfc - sumf) / sumf = \frac{sumfc}{sumf}$$

```
              where
                     sumfc is the integral of the fancor'ed data
              and    sumf is the weighted sum of the fancor'ed data where the weighting vector is detector dependent and
              calculated according to the interpolation weights
              minus the fancor weights.

Note that this correction factor need be calculated
              only once for each image. This program calculates
              it on the data from the first view, and then applies
              the factor to all subsequent prep data.

c      INPUTS:
c              File (default prep.DAT) containing prep data
c
c      CALLING PARAMETERS:
c              IF     input filename (prep.DAT)
c              OF     output filename (fhprep.dat)
c              ND     no. of detectors per view (540)
c              NV     no. of views (275)
c              DIAG   diagnostics level 0=off/1=low/2=high (1)
c              TYPE   0=prep; 1=interpolated
c
c      SUBROUTINES CALLED:
c              UREAD,UWRITE,FNCOR,GENFCOR
c
c
c
c
c+end
c-----------------------------------------------------------------------
```

```
c
      integer argv(40),argc,ip(550)     !parser stuff
      integer n/540/                    !# of samples/view
      integer v/275/                    !# of views in prep
      integer d/1/                      !diagnostics flag
      integer itype/0/                  !data type is prep
      integer vl,k                      !input file header view length,
c                                                # of views
      integer length
      real ys(540),yc(540)
      real sumint(540),sumintf(540)
      real fcor(540)
      integer it(550)
      integer linter(540)
      real einter(540)
      real f(1080)
      character*30 ifn/'prep.DAT'/      !input filename
      character*30 ofn/'fhprep.dat'/    !output filename
      character*220 table
      character s*75,cf*1               !parser information
c
      data table(1:50)/'IF OF ND NV DIAG TYPE = '/
c
c=============== parse command line ====================
c
      call lib$get_foreign(s)
      call words(s,argc,argv)
      do i=1,argc
         l=argv(i)
         ii=isearch(s,argv(i),table,ip)
         fnum=ffra(s,ip)
         num=fnum
         if(ii.eq.1)call strcpy(ifn,1,s,ip)   !IF: input filename
         if(ii.eq.2)call strcpy(ofn,1,s,ip)   !OF: output filename
         if(ii.eq.3)n=num                     !ND: # of detectors/view
         if(ii.eq.4)v=num                     !NV: # of views
         if(ii.eq.5)d=num                     !DIAG: diagnostics flag
         if(ii.eq.6)itype=num                 !TYPE: data type
      end do
c================ fix filenames and open files =====================
c
      call suffix(ifn,'.DAT')
      call suffix(ofn,'.dat')
      call fopen(0,ifn,2)                !input prep file
      call fopen(1,ofn,1)
      call hread(0,vl,k)
      call hwrite(1,vl,k)

c================ print program status and variables ================== type*,'************ jfhcor ver 1.0 ******************'
      call pdt('------------ start time: ')
      call prs('input filename:    ',ifn)
      call prs('output filename:   ',ofn)
      call pri('number of detectors: ',n)
      call pri('number of views:     ',v)
      call pri('input record length: ',vl)
      call pri('input # of records:  ',k)
      call pri('data type:           ',itype)

length=vl call genfcor(fcor,itype)           !generate fancor table
      call genint(linter,einter,itype)   !generate interpolation tables
      call genfilt(f)                    !generate ramlak convol kernal do i=1,length                      !find integral weight of
         j=linter(i)                     ! true interpolation
         sumint(j)=1.-einter(i)+sumint(j)
         sumint(j-1)=einter(i)+sumint(j-1)
      end do
```

```
        do i=1,length                                   !remove integral weight
           sumintf(i)=sumint(i)-(fcor(i)-1.0)           ! of fancor vector
        end do do i=1,length
           write(6,3000)i,fcor(i),linter(i),einter(i),sumint(i),
     +          sumintf(i)
 3000      format(i5,f7.3,i5,3f7.3)
        end do do iv=1,k
           call uread(0,it,v1)
        do id=1,length
           ys(id)=float(it(id))
        end do call fncor(ys,yc,fcor,itype)                    !apply fan correction
        call inter(ys,yc,linter,einter,itype)           !apply interpolation
        call filt(ys,yc,length,f)                       !apply convolution filter if(iv.eq.1)then                                 !on first view find hcor value
           sumfc=0.
           sumf=0.
           do i=1,length
              sumfc=yc(i)+sumfc
              sumf=yc(i)*sumintf(i)+sumf
           end do if(itype.eq.0)then                           !correct for overlap
              sumpc=0.
              sump=0.
              do i=207,334
                 sumpc=yc(i)+sumpc
                 sump=yc(i)*sumintf(i)+sump
              end do
              sumfc=sumfc-sumpc/2.
              sumf=sumf-sump/2.
           end if
c
           xhcor=1.+(sumfc-sumf)/sumf
c
           write(6,2000)xhcor
 2000      format(' hcor modification factor =',1f12.5)
        end if
c
        do id=1,length
           yc(id)=yc(id)*xhcor
           it(id)=nint(yc(id))
        end do
        call uwrite(1,it,length)
c
        end do
c
c================ close files and exit ==============================
c
        close (unit=0)
        close (unit=1)
        call pdt('-------- stop time:   ')
        end
c
c====================================================================
c--------------------------------------------------------------------
c+help subroutine uread(iu,p,n)
c
c
c
c       Inputs vector P(n) from unit IU
c
c       INPUTS:
c               IU      integer; logical unit number
c               N       integer; length of vector
c
c       OUTPUTS:
c               P       vector of length N
c
```

```
c         SUBROUTINES CALLED:
c              none
c
c         MODS HISTORY:
c
c+end
c-------------------------------------------------------------------
          subroutine uread(iu,p,n)
          dimension p(n)
          read (iu)p
          return
          end
c-------------------------------------------------------------------
c+help subroutine uwrite(iu,p,n)
c
c
c
c         Outputs vector P(n) to unit IU
c
c         INPUTS:
c              IU     integer; logical unit number
c              N      integer; length of vector
c              P      vector of length N
c
c         OUTPUTS:
c              none
c
c         MODS HISTORY:
c
c+end
c-------------------------------------------------------------------
          subroutine uwrite(iu,p,n)
          dimension p(n)
          write(iu)p
          return
          end
c
c===================================================================
c+help subroutine genfcor(fcor,itype)
c
c
c
c         generates fan-beam correction vector for prep or interp data
c         using a detector dependent multiplicative factor of the ratio
c         of a fan beam and parallel beam prep with minor axes such
c         that the ellipses fall on the same edge detector.
c
c         expression for general ellipse is
c
c              y(i) = a * sqrt [ 1 - ( x(i) / b )**2 ]
c
c         where  a=major axis
c                b=minor axis
c         and    x(i)=detector position
c
c         for parallel beam geometry
c
c                x(i) = d * i * l
c         and    b = d * k * l
c
c         where  d = source axis distance
c                i = detector unit
c                k = detector unit of edge of ellipse
c                l = t * pi / 180
c         and    t = 9/110,  subtended detector angle
c
c         which leads to a parallel beam prep of
c
c              yp(i) = a * sqrt [ 1 - ( i / k )**2 ]
c
```

```
c        for fan beam geometry
c
c                x(i) = d * sin ( i * l )
c        and     b = d * sin ( k * l )
c
c        giving a fan beam prep of
c
c                yf(i) = a * sqrt [ 1 - ( sin ( i * l ) / sin ( k * l )**2 ]
c
c        the correction factor thus is a vector defined as
c
c        cor(i)  = yp(i) / yf(i)
c
c                = sqrt[ ( 1 - ( i/k )**2 ) / ( 1 - ( sin(i*l) / sin(k*l) )**2
c
c        for our purposes we choose a mid value of k =170 which
c        minimizes the error for typical sized objects.
c
c        INPUT VARIABLES:
c                ITYPE    integer; 0 = prep; 1 = interpolated
c
c        OUTPUT VARIABLES:
c                FCOR     real vector(540); correction vector
c
c        SUBROUTINES CALLED:
c                none
c+end
c==========================================================================
c
        subroutine genfcor(fcor,itype)
c
        integer n/540/
        integer v/550/
        integer length/476/
        integer idet/170/
        real beta
        real fcor(540)
        real axis/238.5/
        real pi/3.1415927/
        real ldist/630.0/
c
        beta=9.0/110.0
c
        if(itype.eq.0)then
           length=270
           n=540
        end if
c
        if(itype.eq.1)then
           length=476
           n=476
        end if
c
        do i=1,length
           c1=((i-axis)/idet)**2
           c2=(sin((i-axis)*beta*pi/180.)/sin(idet*beta*pi/180.))**2
           c3=(1.-c1)/(1.-c2)
           fcor(i)=sqrt(c3)
        end do
c
        if(itype.eq.0)then
           do i=1,length
              fcor(n+1-i)=fcor(i)
           end do
        end if
c
        return
        end
c
c==========================================================================
c+help subroutine fncor(pi,po,fcor,itype)
```

```
c       applies multiplicative fancor vector to prep or inter data
c
c       INPUT VARIABLES:
c               PI      real; input prep data
c               FCOR    real vector(540); correction weighting coef
c               ITYPE   integer; 0 = prep; 1 = interpolated
c
c       OUTPUT VARIABLES:
c               PO      real vector(540); fan corrected data
c
c       SUBROUTINES CALLED:
c               none
c
c+end
c==================================================================
        subroutine fncor(pi,po,fcor,itype)
c
        integer n/540/
        integer v/550/
        integer length/476/
        real fcor(540)
        real pi(540),po(540)
c
        if(itype.eq.0)then
          length=270
          n=540
        end if
c
        if(itype.eq.1)then
          length=476
          n=476
        end if
c
        do i=1,n
          po(i)=pi(i)*fcor(i)
        end do
c
        return
        end
c
c==================================================================
c+help subroutine genfilt(f)
c
c       generates a ramlak convolution kernal of 1080 length
c
c       INPUT VARIABLES:
c               none
c
c       OUTPUT VARIABLES:
c               F       real vector(1080); convolution kernal
c
c       SUBROUTINES CALLED:
c               none
c
c+end
c==================================================================
c
        subroutine genfilt(f)
c
        real f(1080)
c
        do i=2,541,2
          nn=(i-1)**2
          f(i+1)=0.0
          f(i)=-1.0/nn
        end do
c
        do i=2,541
          ii=1082-i
          f(ii)=f(i)
        end do
c
        f(1)=((4.0*atan(1.0))**2)/4.0
        return
c
```

```
c=====================================================================
c+help  subroutine filt(xi,xo,length,f)
c
c
c
c       applies convolution filtration to a vector. Note this routine
c       must be used on data after overlap interpolation.
c
c       INPUT VARIABLES:
c            XI       real vector(540); input data
c            LENGTH   integer; length of vector
c            F        real vector(1080); convolution kernal
c
c       OUTPUT VARIABLES:
c            XO       real vector(540); filtered output vector
c
c       SUBROUTINES CALLED:
c            none
c+end
c=====================================================================
c
        subroutine filt(xi,xo,length,f)
        integer length
        real xo(540),xi(540),yo(540),f(1080)
        do kf=1,length
           z=0.0
           do i=1,length
              yo(i)=xi(i)
              ik=iabs(kf-i)+1
              z=z+yo(i)*f(ik)
           end do
           xo(kf)=z*6.5
        end do
c
        return
c
        end
c
c+help subroutine genint(l,e,itype)
c
c
c       Generates interpolation look-up tables for fan beam to parallel
c       beam geometry correction.
c
c       The tables consist of two vectors, the first [L] points to the
c       detector unit falling to the left of the desired interpolation
c       position; the second [E] contains the weighting factor for
c       a linear interpolation calculation between the two input data
c       points.
c       Input sampled data corresponds to positions defined by
c
c            R(j) = d * sin (j*beta)        [mm]
c
c       whereas parallel acquisition assumes the data is binned as
c
c            S(i) = d * i * beta            [mm]
c
c       If we define the left hand sample position to the desired
c       interpolation point as
c
c            L(i) = j
c
c       then we can define a weighting factor as
c
c                     S(i) - R(j)
c            E(i) = ---------------
c                    R(j-1) - R(j)
c
c       To apply the interpolation algorithm the two vectors are used
c       as follows. First the left hand sample position is determined
c
c            j = L(i)
c
c       and then the interpolated value is calculated according to
c
c            P (i) = P (j) + [ P (j-1) - P (j) ] * E(i)
c             O       I         I         I
c
c       where P   is the input fan-beam data
c              I
c       and   P   is the interpolated parallel-beam data.
c              O
```

```
c
c       The vectors are generated for prep or interpolated data
c       files ( where interpolated implies 64 detector overlap).
c
c       INPUT VARIABLES:
c            ITYPE    integer; 0=prep; 1=interpolated
c
c       OUTPUT VARIABLES:
c            L        integer vector(540); sample pointer
c            E        real vector(540); interpolation weighting facto
c
c       SUBROUTINES CALLED:
c            none
c
c
c
c+end
        subroutine genint(l,e,itype)
c
c
        real c5(540),c6(540),e(540)
        integer l(540),itype
        integer length/476/
        real beta
        real axis/238.5/
        real bias/0.0/
        real pi/3.1415927/
        real ldist/630.0/
c
        beta=9./110.
        icentre=238
c
        if(itype.eq.0)then
          length=270
          n=540
        end if
c
        if(itype.eq.1)then
          length=476
          n=476
        end if
c
        do i=1,length
          c5(i)=ldist*(i-axis)*beta*pi/180.
          c6(i)=ldist*sin((i-axis)*beta*pi/180.)
        end do
c
        do i=1,icentre
          do k=1,i
            if(abs(c6(k)).gt.abs(c5(i)))goto 100
            l(i)=k
            goto 110
100         continue
          end do
110       continue
        end do
c
        do i=icentre+1,length
          do k=i,length
            if(abs(c6(k)).lt.abs(c5(i)))goto 120
            l(i)=k
            goto 130
120         continue
          end do
130       continue
          if(l(i).eq.0)l(i)=length
        end do
c
        do i=1,length
          denom=c6(l(i)-1)-c6(l(i))
          if(denom.eq.0.)denom=1.
          e(i)=(c5(i)-c6(l(i)))/denom
          if(e(i).lt.0.0.or.e(i).gt.1.0)e(i)=0.
        end do
c
        if(itype.eq.0)then
          do i=1,length
            it=n+1-i
            l(it)=542-l(i)
```

```
              if(l(it).gt.n)l(it)=n
              c5(it)=-c5(i)
              c6(it)=-c6(i)
           end do
           l(length+1)=length+1
           do i=length+1,n
              denom=c6(l(i)-1)-c6(l(i))
              if(denom.eq.0.)denom=1.
              e(i)=(c5(i)-c6(l(i)))/denom
              if(e(i).lt.0.0.or.e(i).gt.1.0)e(i)=0.
           end do
        end if
c
c
c       do i=1,n
c          write(6,1000)i,l(i),c5(i),c6(i),e(i)
c1000      format(2i4,3f14.4)
c       end do
c
        return
c
        end
c
c
c
c========================================================================
c+help subroutine inter(pi,po,l,e,itype)
c
c
c
c       Does interpolation function for fan beam to parallel
c       beam geometry correction using lut vectors defined by subroutine
c       GENINT.
c
c       The tables consist of two vectors, the first [L] points to the
c       detector unit falling to the left of the desired interpolation
c       position; the second [E] contains the weighting factor for
c       a linear interpolation calculation between the two input data
c       points.
c
c       Input sampled data corresponds to positions defined by
c
c             R(j) = d * sin (j*beta)        [mm]
c
c       whereas parallel acquisition assumes the data is binned as
c
c             S(i) = d * i * beta            [mm]
c
c       If we define the left hand sample position to the desired
c       interpolation point as
c
c             L(i) = j
c
c       then we can define a weighting factor as
c
c                    S(i) - R(j)
c             E(i) = --------------
c                    R(j-1) - R(j)
c
c       To apply the interpolation algorithm the two vectors are used
c       as follows. First the left hand sample position is determined
c
c             j = L(i)
c
c       and then the interpolated value is calculated according to
c
c             P (i) = P (j) + [ P (j-1) - P (j) ] * E(i)
c              O       I         I         I
c
c       where P   is the input fan-beam data
c              I
c       and   P   is the interpolated parallel-beam data.
c              O
c
c       The vectors are generated for prep or interpolated data
c       files ( where interpolated implies 64 detector overlap).
c
```

```
c      INPUT VARIABLES:
c           PI      real vector(540); input prep/inter data
c           L       integer vector(540); sample pointer
c           E       real vector(540); interpolation weighting factors
c           ITYPE   integer; 0=prep; 1=interpolated
c
c      OUTPUT VARIABLES:
c           PO      real vector(540); output interpolated prep/int dat
c
c      SUBROUTINES CALLED:
c                   none
c+end c======================================================================
c
       subroutine inter(pi,po,l,e,itype)
_c
       real pi(540),po(540),e(540)
       integer l(540),itype
       integer length,n
c
       if(itype.eq.0)then
          length=270
          n=540
       end if
c
       if(itype.eq.1)then
          length=476
          n=476
       end if
c
       do i=1,length
          j=l(i)
          po(i)=pi(j)+(pi(j-1)-pi(j))*e(i)
       end do
c
c      do i=1,length
c        write(6,1000)i,l(i),e(i),pi(i),po(i
c1000    format(2i4,4f14.4)
c      end do
       return
       end
c
c---------------------------------------------------------------------
```

Thus a method for detecting, modifying and rearranging divergent beams derived data for obtaining tomographic images with maximum spatial resolution and minimum artifacts has been disclosed. The system reorders the initial fan beam data to obtain unequally spaced parallel projections. These are preprocessed for normalization purposes to provide logrithmic values of the unequally spaced parallel projections. A flatness correction factor is used to multiply this data. The product is filtered and rebinned in a preferred embodiment. The rebinning provides twice the initial data in an interpolation step. The rebinned data is backprojected. The data is also subjected to modified height correction during the back projection process. The image processor processes the backprojector data to provide pixels for display purposes.

While the invention has been explained using exemplary aspects of the invention it should be understood that the exemplary aspects are used for purposes of explanation only and not as limitations on the scope of the invention.

What is claimed is:

1. A method for detecting, modifying and rearranging divergent beam derived data to obtain tomographic images with maximum spacial resolution and with minimum artifacts, said method enabling fast processing, the method includes the steps of:
   (a) directing a divergent beam of penetrating radiation through a body being examined from source means on one side of said body,
   (b) angularly displacing the divergent beam relative to the body,
   (c) detecting radiation that is passed through the body at a number of angularly spaced positions within the angles subtended by the divergent beam,
   (d) deriving sets of detected radiation data representative of the variety of angularly and laterally spaced projections indicative of the transmission of the radiation through respective portions of the body,
   (e) reordering the sets of detected radiation data to obtain laterally unequally spaced sampled data corresponding to parallel projections,
   (f) correcting the reordered data for flatness,
   (g) rebinning the sets of data corresponding to said reordered data to obtain laterally equally spaced parallel views, and
   (h) back-projecting said laterally equally spaced parallel views to form tomographic images.

2. The method of claim 1 including the step of filtering prior to said backprojecting.

3. The method of claim 2 wherein the step of filtering is prior to said step of backprojecting.

4. The method of claim 3 wherein said rebinning comprises the steps of:
   (a) setting the lateral spacing of the sets of data to the equivalent parallel spacing by linear interpolation, and
   (b) creating in the process more sample points than originally available.

5. The method of claim 4 wherein the number of data points are doubled.

6. The method of claim 4 wherein the interpolation comprises the steps of:

(a) defining rating factors based on a assigned function in corresponding pointer values where the rating factors are $E(i) = ([\sin (jL)]/L - i)$ where
i is a sample number,
L is the detector to detector angle, and
j equals left hand sample position (original data) index indicating the original neighbour samples, and (b) calculating the interpolated values according to P equal(i) = P nonequal(j) + (P nonequal(j − 1)-P nonequal(J)) E(i).

7. The method of claim 3 including a preprocessing step, said preprocessing step comprising the steps of:
normalizing the laterally unequally spaced sample data corresponding to parallel projections, and
obtaining natural logarithms of the normalized laterally unequally spaced sample data corresponding to parallel projections.

8. The method of claim 7 including the step of determining an image height correction value from a set of said normalized laterally unequally spaced sampled data for correcting brightness levels in the tomographic image.

9. The method of claim 8 wherein said height correction value is given by a ratio of integral values of data corresponding to parallel equal laterally spaced shadowgram data divided by integral values of parallel non-equal laterally spaced shadowgram data.

10. The method of claim 9 wherein said integral values of data corresponding to parallel equal laterally spaced shadowgram data is computed directly from parallel non-equal laterally spaced shadowgram data with an appropriate integral weighting vector.

11. The method of claim 10 wherein said integral weighting vector INTWT is determined as

```
do i = 1, view_length
    j = point (i)
    INTWT (j) = 1 − E(i) + INTWT (j)
    INTWT (j − 1) = E(i) + INTWT (j − 1)
end do
```

12. The method of claim 1 wherein forming tomographic images by backprojecting equal laterally spaced parallel filtered projection views includes the step of modifying the height of the image.

13. The method of claim 1 including the step of transforming sets of data corresponding to sets of laterally unequal spaced parallel projection data into sets of data corresponding to sets of laterally unequal spaced parallel processed projection data.

14. The method of claim 13 wherein said transforming comprises applying a distortion function defined by:

$f\text{cor}(i) = [1 - (i/k)^2]/[1 - (\sin (iL)/\sin (kL))^2]^{\frac{1}{2}}$ where:
i = sample or detector number,
k = half the object size in detector units,
L = the detector-to-detector angle in radians.

15. A system for detecting, modifying and rearranging divergent beam derived data to obtain tomographic images with maximum spacial resolution and with minimum artifacts, said system enabling fast processing, the system comprises:
(a) means for directing a divergent beam of penetrating radiation through a body being examined from source means on one side of said body, (b) means for angularly displacing the divergent beam relative to the body,
(c) means for detecting radiation that is passed through the body at a number of angularly spaced positions within the angles subtended by the divergent beam,
(d) means for deriving sets of detected radiation data representative of angularly and laterally spaced projections indicative of the transmission of the radiation through respective portions of the body,
(e) means for reordering the sets of detected radiation data to obtain laterally unequally spaced sampled data corresponding to parallel projections,
(f) means for correcting the reordered data for flatness,
(g) means for rebinning the sets of data corresponding to said reordered data, to obtain laterally equally spaced parallel views, and
(h) means for backprojecting said laterally equally spaced parallel views to form tomographic images.

16. The system of claim 15 including means for filtering prior to backprojecting.

17. The system of claim 16 wherein said means for filtering operates prior to said means for rebinning.

18. The system of claim 17 wherein said means for rebinning comprises;
(a) interpolation means for setting the lateral spacing of the sets of data to the equivalent parallel spacing by linear interpolation, and
(b) means for creating in the process more sample points than originally available.

19. The system of claim 18 wherein the number of data points are doubled.

20. The system of claim 18 wherein the interpolation comprises:
(a) means for defining rating factors based on a assigned function in corresponding pointer values where the rating factors are:

$E(i) = ([\sin (jL)]/L - i)$ where:
i is a sample number,
L is the detector to detector angle, and
j equals left hand sample position (original data) index indicating the original neighbour samples, and (b) means for calculating the interpolated values according to P equal (i) = P nonequal(j) + (P nonequal(j − 1)-P nonequal(J))E(i).

21. The system of claim 15 including means for preprocessing the reordered sets of detected radiation data, said means for preprocessing including means for normalizing the laterally unequally spaced parallel projections, and means for taking the natural logarithm of the normalized laterally unequally spaced parallel projections.

22. The system of claim 21 including means for determining an image height correction value from the natural logarithms of a set of said normalized laterally unequally spaced parallel projections for correcting brightness levels in the tomographic image.

23. The system of claim 22 wherein said height correction value is given by a ratio of integral values of data corresponding to parallel equal laterally spaced shadowgram data divided by integral values of parallel non-equal laterally spaced shadowgram data.

24. The system of claim 23 wherein means are provided for computing said integral values of data corresponding to parallel equal laterally spaced shadowgram data directly from parallel non-equal laterally spaced shadowgram data with an appropriate integral weighting vector.

25. The system of claim 24 wherein said integral weighting vector INTWT is determined as

```
do  i = 1, view_length
    j = point (i)
    INTWT (j) = 1 − E(i) + INTWT (j)
    INTWT (j − 1) = E(i) + INTWT (j − 1)
end do
```

26. The system of claim 15 wherein said means for forming tomographic images by backprojecting equal laterally spaced parallel filtered projection views includes means for modifying the height of the image.

27. The system of claim 15 including means for transforming sets of laterally unequally spaced parallel projection data into sets of the natural logarithms of normalized laterally unequally spaced parallel projection data.

28. The system of claim 27 wherein said means for transforming comprises means for applying a distortion function defined by:

$$f\text{cor}(i) = [1 - (i/k)^2]/(1 - (\sin(iL)/\sin(kL)^2)]^{\frac{1}{2}}$$

wherein:
 i = detector or sample number,
 L = the detector-to-detector angle in radians, and
 k = half the object size in detector units.

* * * * *